United States Patent [19]

Van Vechten

[11] 4,136,525
[45] Jan. 30, 1979

[54] DIELECTIC REFRIGERATOR USING ORIENTABLE DEFECT DIPOLES

[75] Inventor: James A. Van Vechten, New Castle, N.Y.

[73] Assignee: International Business Machines Corporation, Armonk, N.Y.

[21] Appl. No.: 755,890

[22] Filed: Dec. 30, 1976

[51] Int. Cl.² ............................................. F25B 21/02
[52] U.S. Cl. ....................................... 62/3; 62/467 R
[58] Field of Search ....................................... 62/3, 467

[56] References Cited

U.S. PATENT DOCUMENTS

| | | | |
|---|---|---|---|
| 3,108,444 | 10/1963 | Kahn | 62/3 |
| 3,332,807 | 7/1967 | Boehmer et al. | 62/3 |
| 3,393,526 | 7/1968 | Pearl | 62/3 |
| 3,638,440 | 2/1972 | Lawless | 62/3 |
| 3,790,829 | 2/1974 | Roth | 62/3 |
| 3,823,570 | 7/1974 | Wallace | 62/3 |
| 3,865,557 | 2/1975 | Andres et al. | 62/3 |

OTHER PUBLICATIONS

*Instrum. & Exp. Tech. (USA),*" vol. 16, No. 3, pt. 2, (May-Jun. 1973), Thermostating Crystals at Temp Below 10 K, pp. 950-952.

*Primary Examiner*—Lloyd L. King
*Attorney, Agent, or Firm*—Bernard N. Wiener

[57] ABSTRACT

This disclosure describes a dielectric refrigerator using orientable defect dipoles and operating between a high temperature, $T_h$ reservoir illustratively supplied by a Stirling cycle refrigerator (8° K $\leq T_h \leq$ 20° K) and a low temperature, $T_l$, load, illustratively the liquid He cooling fluid for Josephson junction or other superconducting devices (2° K $\leq T_l \leq$ 6° K).

Exemplary practice of this invention provides cooling from the limit of a refrigerator based on the Stirling thermodynamic cycle (20 to 8° K) to operating temperatures of common and useful superconductive devices (3 to 6° K). Orientable electric dipoles of defects in electrically insulating materials, e.g., crystals, are utilized to provide cooling in the range from (8–20 K) to (2–6° K). The following are particular considerations concerning the practice of this invention: use of LiF, MgO and BeO as host crystals; use of OH and/or NH₂ as defects in LiF, and use of HF, HCl, HBr and/or NH as defects in MgO or BeO; mechanical or electromechanical means to make and break thermal contact between dielectric crystal and load and between load and reservoir; and use of thermal rectifiers to obviate the need for thermal switches in order to transfer heat from the load to the refrigerator material and thence to the reservoir.

7 Claims, 8 Drawing Figures

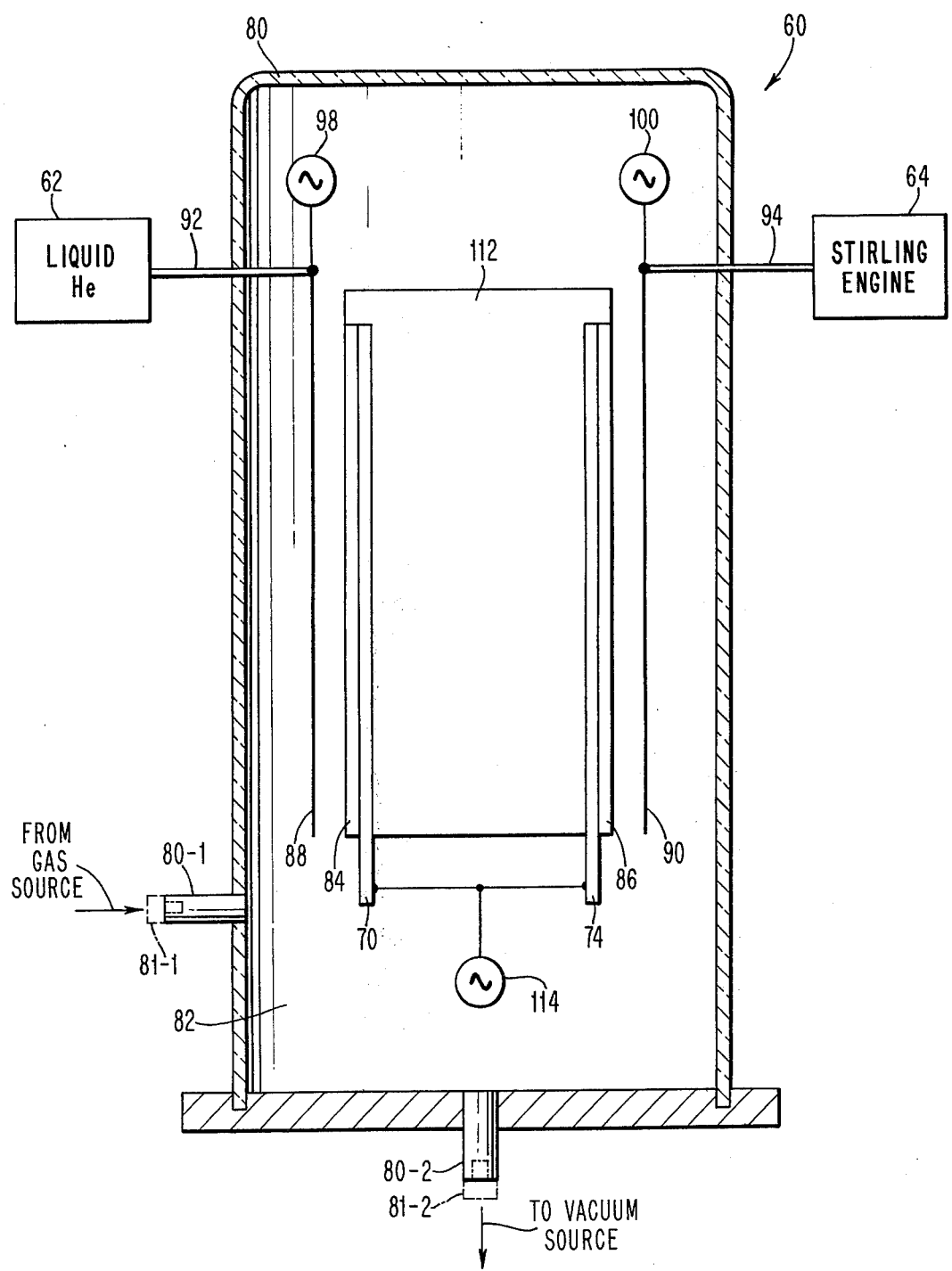

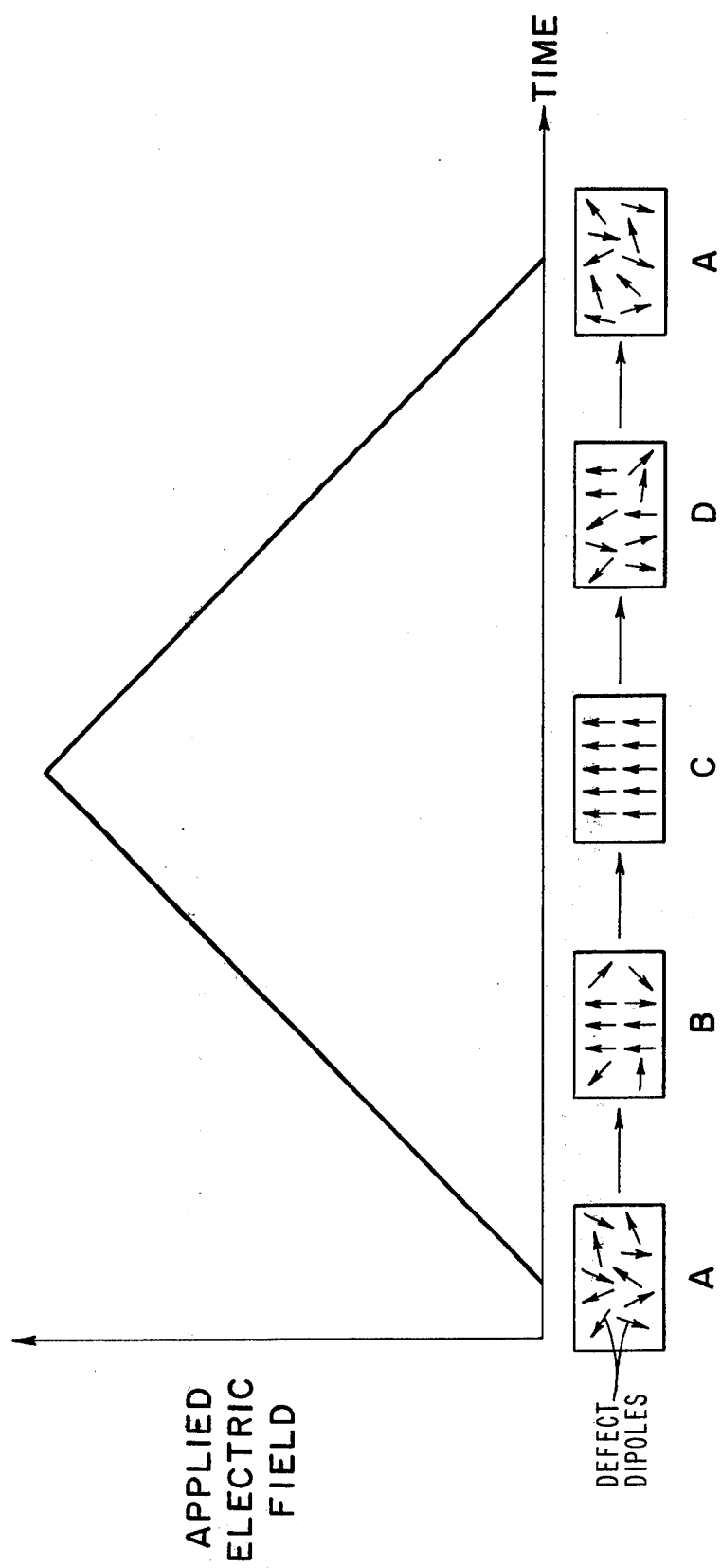

DIELECTRIC REFRIGERATOR USING ORIENTABLE DEFECT DIPOLES

BACKGROUND OF THE INVENTION

Electrocaloric effects in both ferroelectric and non-ferroelectric dielectric media have previously been reported in the literature. A. Kikuchi, et al, J. Phys. Soc. Japan 19, 1497 (1964) and E. Hegenbarth, Phys. Stat. Sol. 8, 59 (1965) describe the electrocaloric effect in a single crystal ferroelectric, and E. Hegenbarth, Cryogenics 1, 242 (1961) describes it in a ceramic ferroelectric, and I. W. Shepherd, J. Phys. Chem. Solids 28, 2027 (1967) describes it as observed in the non-ferroelectric material KCl containing orientable OH⁻ defects. The terminology and technology as disclosed by said latter reference are incorporated herein by reference for the purpose of the practice of the present invention.

The existence of an electrocaloric effect suggests that it might be possible to construct a refrigerator based on this effect. However, the capacity of a refrigerator which might be constructed using the electrocaloric effect in ferroelectric materials is severely limited by the saturation of the temperature dependent polarization at high fields and by the relatively low Debye temperatures, $\theta_D$, of ferroelectric crystals. The maximum $\Delta T$ around 10K which has been reported to date in a ferroelectric medium is the 0.28 degree electrocaloric effect at 11.5° K. in single crystal SrTiO₃ described by Kikuchi, et al (op. cit.). It appears that the magnitude of this $\Delta T$ might be increased by about a factor of 4 by resort to higher electric fields. A substantially greater increase in $\Delta T$ could be obtained were it possible to use a ferroelectric with a Debye temperature $\theta_D$ significantly greater than that of SrTiO₃, but this does not seem to be possible; the $\theta_D$ of ferroelectrics are always suppressed by the soft phonon modes which are responsible for their ferroelectric behavior. No successful attempt to make a refrigerator based on the electrocaloric effect in ferroelectrics has been reported.

The maximum electrocaloric effect observed by Shepherd (op. cit.) in KCl crystals containing OH⁻ defects was between 0.3K and 1.3K. This was produced by the adiabatic orientation and randomization of the electric dipoles of the OH⁻ defects in an applied electric field when the KCl was formed into a capacitor and carefully isolated thermally within a liquid He cryostat. The physical principles of this effect were discussed by Shepherd who likened them to magnetic cooling. However, no attempt to use this effect in KCl or similar materials to construct a dielectric refrigerator operating over any temperature range has been reported.

SUMMARY OF THE INVENTION

It is an object of this invention to provide a dielectric refrigerator system which utilizes orientable defect dipoles and which operates between a high temperature, $T_h$, reservoir and a low temperature, $T_l$, load.

It is another object of this invention to provide a dielectric refrigerator system which provides cooling from the lower temperature limit of a refrigerator based on the Stirling thermodynamic cycle to the operating temperature of common and useful superconducting devices.

It is another object of this invention to provide a dielectric refrigerator system which provides for liquifaction of He.

It is another object of this invention to provide a dielectric refrigerator system wherein there is associated mechanical or electromechanical means for making and breaking alternately thermal contact between the dielectric region and the reservoir and between it and the load.

The foregoing objects and advantages of this invention are achieved by a dielectric refrigerator using orientable defect electric dipoles in a solid state matrix and operating between a high temperature, $T_h$, reservoir and a low temperature, $T_l$, load.

Exemplary practice of this invention provides cooling from the limit of a refrigerator based on the Stirling thermodynamic cycle (20 to 8° K.) to operating temperatures of common and useful superconductive devices (3 to 6° K.). Orientable electric dipoles of defects in electrically insulating materials, e.g., crystals, are utilized to provide cooling in the range from (8–20° K.) to (2–6° K.). The following are particular considerations concerning the practice of this invention: use of LiF, MgO and BeO as host crystals, use of OH and/or NH₂ as defects in LiF, and use of HF, HCl, HBr and/or NH as defects in MgO or BeO; mechanical or electromechanical means to make and break thermal contact between dielectric crystal and load and between load and reservoir; and use of thermal rectifiers to obviate the need for thermal switches in order to transfer heat from the load to the refrigerator material and thence to the reservoir.

Due to the much greater strength of the electrostatic interaction than the magnetic interaction, a dielectric defect dipole refrigerator of this invention is capable of operating at much greater temperatures than by magnetic cooling, i.e., $\lesssim 30°$ K. rather than $\lesssim 1°$ K., provided that the problem of dielectric breakdown along the surface is managed. The capacity of a refrigerator in accordance with the principles of this invention based on the electrocaloric effect in nonferroelectric crystals containing orientable defect dipoles is limited by the Debye temperature $\theta_D$ of the host material and by the concentration of the defects, $N_d$, that may be incorporated therein without losing the thermal randomization of defect orientation due to defect-defect interaction during the depolarization phrase of the cycle.

PRACTICE OF THE INVENTION

The capacity a dielectric refrigerator utilizing orientable dipoles can be substantially improved in accordance with the principles of this invention by utilizing host materials having a higher Debye temperature $\theta_D$ than KCl ($\theta_D$(KCl(3 × 10¹⁸ OH⁻) = 180° K.), e.g. higher than approximately 500° K. Exemplary host and dipole materials are LiF : OH⁻, $\theta_D \approx$ 740° K; MgO: HCl⁺, $\theta_D \approx$ 820° K; BeO: HCl⁺, $\theta_D \approx$ 1000° K. As lattice heat capacity is, in the Debye approximation, proportional to $\theta_D^{-3}$, the $\Delta T$ for $N_d$ = 2.8 × 10¹⁸/cm³ at 8° K. is only 0.011° K. for KCl, but and it is 0.87° K. for LiF, 1.25° K. for MgO, and 2.8° K. for BeO. The free energy of thermal randomization varies as kT and the dipole-dipole interaction varies as distance cubed. Therefore, the optimal value of $N_d$ is increased in proportion to the desired load temperature. Thus, for a load temperature of 6° K. compared to 0.3° K. the optimal value of $N_d$ in a factor of 20 greater, i.e. 5.6 × 10⁹/cm³ instead of 2.8 × 10¹⁸. Accordingly, by optimizing $N_d$ cooling is attainable in a single stage to 6° K. from 14° K. with LiF, from 16° K. to 6° K. with MgO, and from 19° K. to 6° K. with BeO.

An important advantage of a dielectric refrigerator according to this invention is that the device can be cycled very rapidly once the desired ΔT is obtained. This is because the capacity of the refrigerator to remove heat from the load is proportional to the cycle rate. The limitation on the cycle time of a dielectric refrigerator of this invention due to the host dielectric medium itself is in the microsecond range. Therefore, the practical limitation on cycle time is the making and breaking of the thermal contact to the load and to the reservoir. An exemplary cycle rate of $10^3$/sec is obtainable by the practice of this invention.

A high temperature annealing and quenching process for the dielectric material is utilized to reduce the problem of the clustering of the orientable defects in the as grown material.

CONSIDERATIONS FOR THE INVENTION

A dielectric refrigerator in accordance with the principles of this invention works by orienting the electric dipoles of defects in a dielectric material. The dipoles can be aligned by an applied electric field which provides for control of the entropy of the system by external means. When the electric field is decreased adiabatically, the dipoles reorient causing a cooling of the lattice and of the load connected to it.

The capacity of a dielectric refrigerator of this invention is limited by $\theta_D$, the Debye temperature of the dielectric host material, and by the concentration, $N_d$, of defects that may be incorporated therein without losing the randomization of defect orientation during the depolarization phase of the cycle due to defect-defect interaction. The lattice specific heat, $C_L$, and therefore $S_l$, lattice entropy, is proportional to $\theta_D^{-3}$ in the Debye approximation. In order to obtain effective cooling, the controllable dipole entropy, $S_d$, must be larger than the lattice entropy, $S_l$. Therefore, dielectric materials with large $\theta_D$ are desirable for purpose of this invention.

For given load temperature, host material and defects, there exists an optimum concentration, $N_d$, of dipole defects. As the dipole entropy, $S_d$, is directly proportional to $N_d$, if $N_d$ is too small, the externally controllable entropy cannot remove all of the lattice entropy. And if $N_d$ is too large, dipole-dipole interactions reduce the effective number of dipoles which can be oriented in an applied field, i.e., the defects will not randomize their orientations during depolarization. Clustering of defects during the preparation of the host dielectric material will have a detrimental impact upon the efficiency of the device. This clustering in the as grown material is reduced by a high temperature annealing and quenching process.

Under an assumption of zero clustering, a Debye approximation for the lattice specific heat, the free energy ΔG, which can be removed at $T_l$, the load temperature, in each cycle for a dipole refrigerator operating between the reservoir temperature $T_h$ and $T_l$ is $$\Delta G = N_d k T_l \ln W_d - \frac{4\pi^4}{5} \frac{N_A}{N_d} ((\frac{T_h}{\theta_D})^3 - (\frac{T_l}{\theta_D})^3)] \quad (1)$$

where $W_d$ is a structure dependent degeneracy factor and $N_A$ is the concentration of all atoms. $W_d = 6$ for rock salt lattices. Therefore, for $5.6 \times 10^{19}$/cm³ orientable dipoles in LiF or MgO, the expression (1) for ΔG becomes $$\Delta G \approx 8.3 \times 10^{-3} \frac{\text{joules}}{\text{cm}^3} [1.8 - 1.7 \times 10^5((\frac{T_h}{\theta_D})^3 - (\frac{T_l}{\theta_D})^3)] \quad (2)$$

An exemplarly embodiment of this invention has a cycle rate of 1000 Hertz which provides a cooling power of 3 watts/cm³ for OH dipoles in LiF operating between 4° K. and 15K.

BRIEF DESCRIPTION OF THE DRAWINGS

FIG. 1 is a schematic diagram showing a first exemplary embodiment of this invention wherein mechanical blades provide thermal switching between the capacitor component and the heat reservoir and load to be cooled respectively and are passed sequentially proximate to the capacitor component of the dielectric refrigerator of this invention so that heat is transferred, wherein

FIG. 3B presents an additional exemplary embodiment of this invention comparable to the embodiment of 3A and differs therefrom substantially only in electrical connection circumstances at the capacitor.

FIG. 5 shows schematically the alignment and randomization of orientation of the defect dipoles with applied electric field through the course of the thermodynamic cycle of FIG. 2.

EMBODIMENTS OF THE INVENTION

Figure 1A:
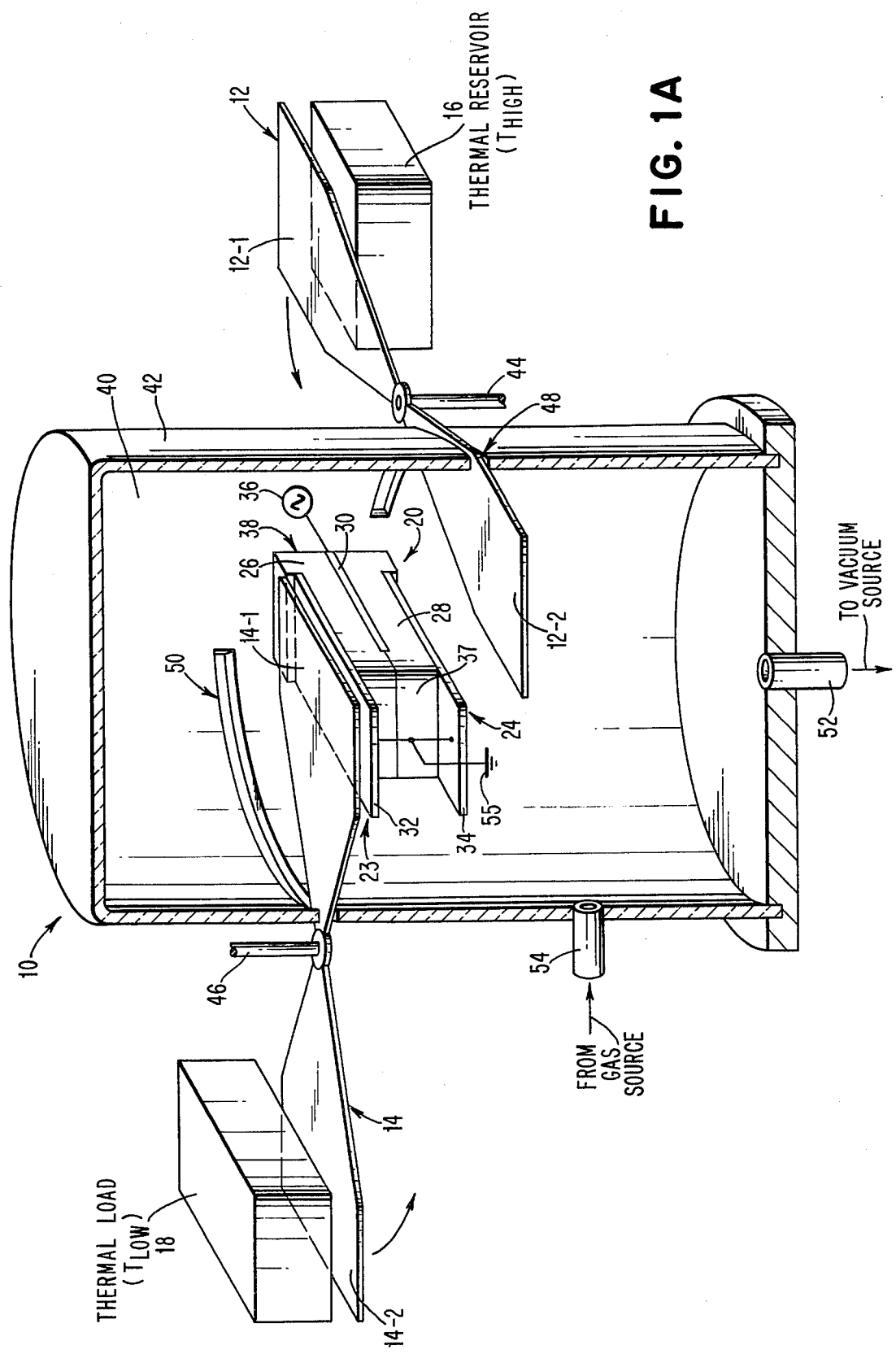
FIG. 1A is a partially cut away perspective view and FIGS. 1B and 1C are respectively partial side and top views in the vicinity of the capacitor.
Figure 1B:
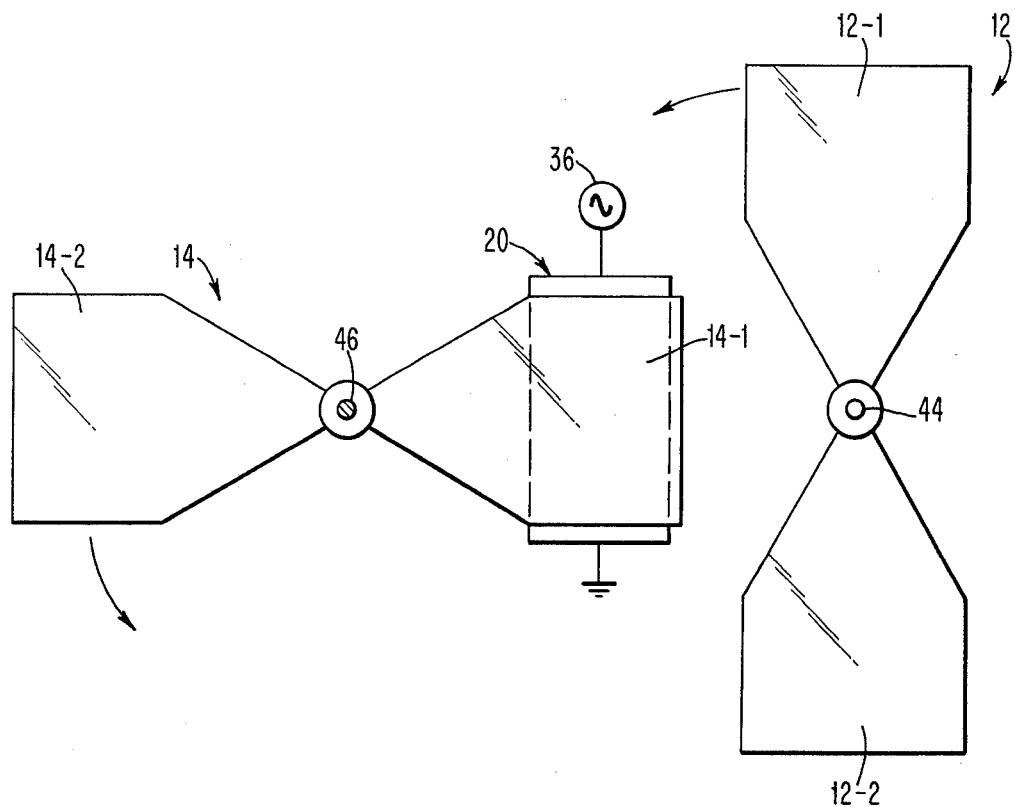
Figure 1C:
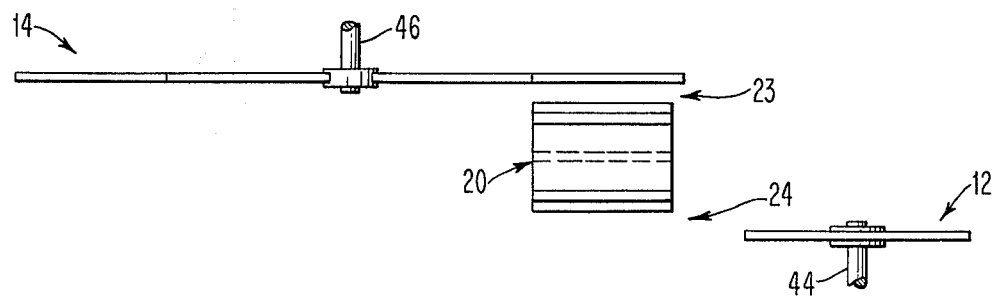

FIGS. 1A, 1B and 1C are views of an exemplary embodiment of this invention. FIG. 1 is a schematic diagram showing the first exemplary embodiment 10 of this invention wherein mechanical blades 12 and 14 in thermal communication with the reservoir 16 and load 18 respectively are passed sequentially proximate to the dielectric capacitor 20 of the invention in gas heat transfer relationships via local gas media 23 and 24.

Figure 2:
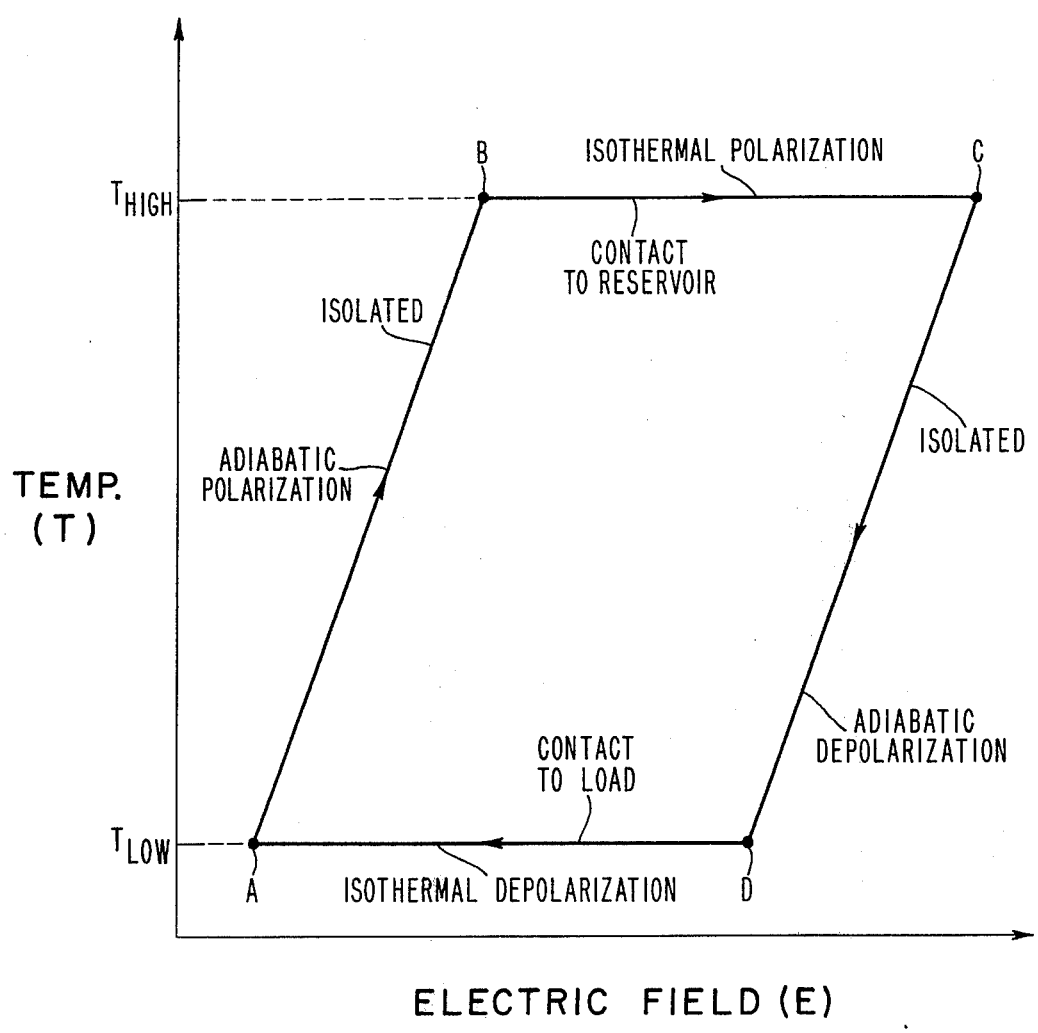
FIG. 2 shows a thermodynamic cycle for the operation of an embodiment of the dielectric refrigerator per the principles of this invention, showing the thermal transformation between low temperature, $T_l$, load and high temperature, $T_h$, reservoir.

FIG. 2 shows a thermodynamic cycle for the operation of an embodiment of the dielectric refrigerator illustrated in FIG. 1 per the principles of this invention showing the thermal transformations between low temperature $T_l$, load and high temperature $T_h$ reservoir. At point A, the dielectric capacitor 20 is subject to the minimum applied electric field, E, of the cycle, which may be zero, and is at the low temperature of the load 18 $T_l$. The orientable defect dipoles within the capacitor dielectric material are in a random distribution of orientations as indicated in FIG. 5; and the dielectric itself is in the state of minimum polarization of the cycle, which may be zero. Starting from point A, the capacitor 20 is thermally isolated from both load 18 and reservoir 16 by means of thermal switching apparatus, such as blades 12 and 14 of FIG. 1 or flaps 88 and 90 of FIG. 3, and a monotonically increasing electric field, E, is applied causing the partial polarization of the dielectric and the partial orientation of the defect dipoles therein with a concomitant rise in temperature until at point B the temperature of the capacitor has risen to that of the reservoir 16, $T_h$. At point B, the capacitor 20 is put into thermal contact with the reservoir 16 by means of the thermal switching apparatus. Thereafter, the applied field, E, continues to increase monatonically causing the orientable defect dipoles within the dielectric to become more and more uniformly oriented colinear with and opposite to the applied electric field, E. As this occurs, the heat which is generated by the orientation of the electric dipoles in the applied electric field flows through the thermal switch, such a blade 12, from the capacitor 20 into the reservoir 16, where it is dissipated by the Stirling engine or other apparatus that is maintaining the reservoir 16, so that the temperature of the capacitor does not rise substantially. At point C the maximum value of the applied electric field for the cycle is reached and the maximum degree of orientation of the orientable dipoles and of polarization of the dielectric is attained as indicated in FIG. 5. After point C is reached, the capacitor is again thermally isolated from both the load 18 and the reservoir 16 by means of said thermal switching apparatus and the applied electric field E is monatonically decreased so that the degree of polarization of the dielectric is decreased and the degree of randomness in the distribution of orientations of the orientable defect dipoles within the dielectric increases, causing a concomitant decrease in temperature of the entire capacitor 20. This physical process continues until at point D the temperature of the capacitor 20 has fallen to that of the load 18 whereupon the capacitor 20 is put into thermal contact with the load 18 by means of the thermal switching apparatus. Thereafter, the applied electric field E continues to decrease monotonically and the degree of randomness in the distribution of orientation of the orientable defect dipoles continues to increase. The energy which is required to reorient the defect dipoles is taken from the heat of the lattice of the dielectric material, which is resupplied by a flow of heat from the load 18 through the thermal switching apparatus, such as blade 14 of FIG. 1 or flap 88 of FIG. 3, to the capacitor 20. Finally, at point A, the applied electric field reaches its minimum value, and the conditions of the refrigerator system have returned to their original thermodynamic state and the cycle may be repeated.

Crystals 26 and 28 are separated by energized electrode 30 which is between and in contact with these two crystals. Electrodes 32 and 34 are connected to ground 55 and may be produced by vapor deposition on the respective outer surfaces of the two insulating crystals 26 and 28. Electrode 30 is connected to variable voltage source 36 sufficient to produce field between $10^5$ and $10^6$ V/cm in crystals 26 and 28. In order to minimize chance of dielectric breakdown along the surfaces of the crystals 26 and 28, this electrode 36 should pass out of the crystal through a surface 38 different from that surface used for grounding contacts 32 and 34. Moreover, energized electrode 30 terminates a distance d ∼ 0.1 cm from surface 37 used for the grounding electrodes and their grounding electrodes preferably terminate distance d' ∼ 0.1 cm from the one surface 38, used for the energized electrode 30.

Blades 12 and 14 of the thermal switch apparatus are used to establish thermal contact sequentially between the capacitor 20 and reservoir 16 or load 18. These blades are driven by means not shown which cause them to pass alternately close by the outer surfaces of the crystals 26 and 28. The heat energy transfer from crystal to blade occurs by conduction via He or $H_2$ gas across the small (about 0.1 cm) gap between crystal and passing blade. Alternatively, it may be arranged to pass the crystals 26 and 28 by the respective blades 14 and 12.

There now follows description of other details of the embodiment 10 of this invention illustrated by FIG. 1.

The capacitor 20 is housed within chamber 40 defined by housing 42. Blades 12 and 14 are driven by shafts 44 and 46 by drive means, not shown, so that blade portions 12-1 and 12-2 of blade 12 and blade portions 14-1 and 14-2 of blade 14 pass through slit orifices 48 and 50 in housing 42.

Mechanical blades 12 and 14 are comprised of Ag or Cu for exemplary practice of this invention.

A partial vacuum is established in chamber 40 via pipe 52 by means not shown, and gas for thermal conduction purposes is introduced into chamber 42 via pipe 54 by means not shown. Thermal conduction to blade 14 at thermal reservoir 16 and to blade 12 at thermal load 18 are achieved by local gas layers similar to 23 and 24 established by sources not explicity shown. In the example that the load 18 is helium gas which is being liquified, the thermal conduction gas is conveniently He; and in the example that the thermal reservoir is a Stirling refrigeration engine operating on He gas, the thermal conduction gas thereat is conveniently He.

Insulating dielectric crystals 26 and 28 have thickness in the approximate range of 0.05 cm to 3 cm. For exemplary practice of this invention they are composed of LiF containing OH defects. The $OH^-$ defect concentration is in the approximate range from $2 \times 10^{18}/cm^3$ to $8 \times 10^{19}/cm^3$. Alternative materials are MgO or BeO containing defects of HF, HCl, HBr, HI or NH, and LiF containing $NH_2$.

Figure 3A:
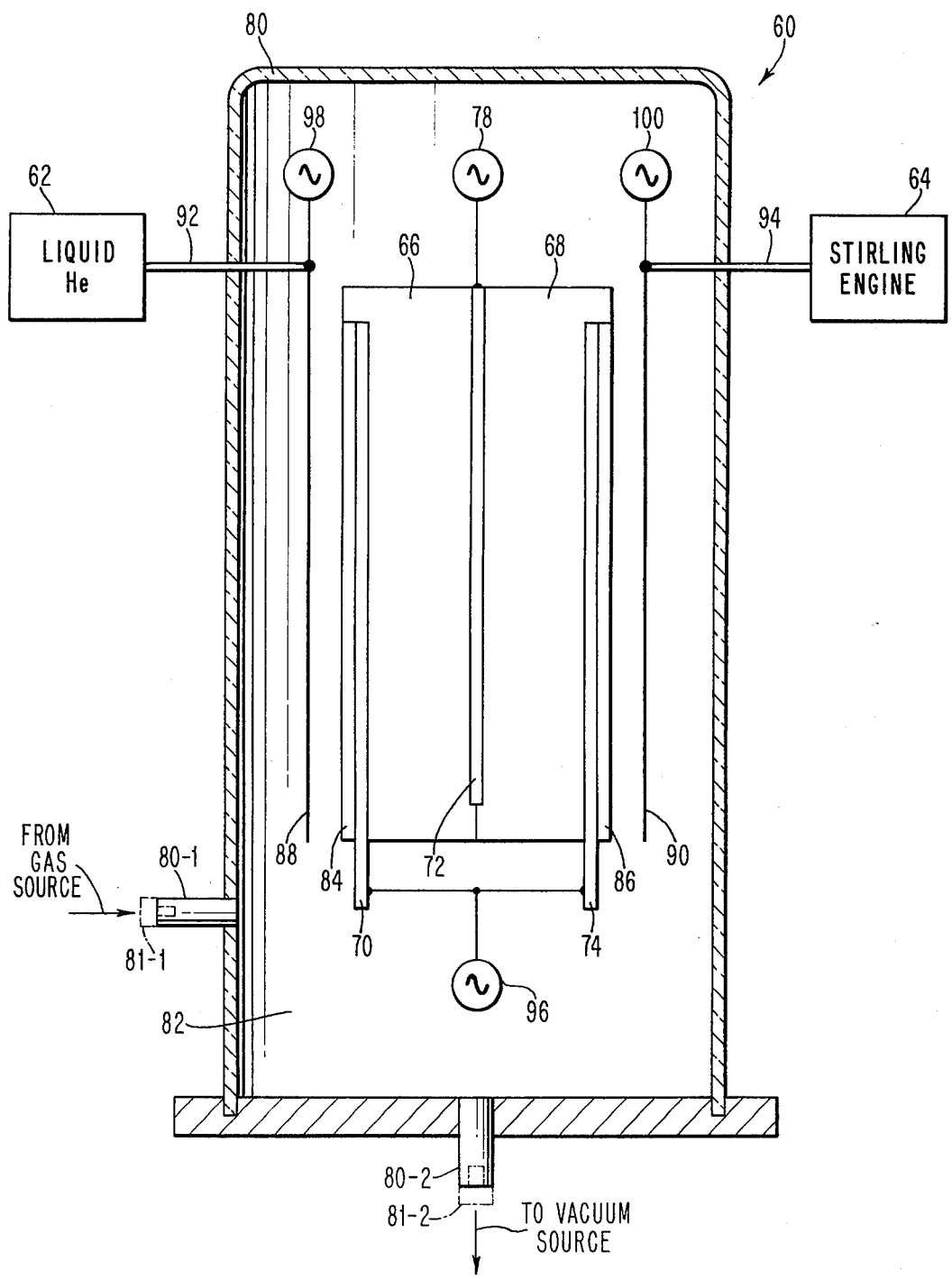
FIG. 3A presents another exemplary embodiment of this invention in which the thermal switching portions utilize flexible metallic flaps which are either attracted or repelled by electrodes at the dielectric refrigerator in accordance with the requirements of the thermodynamic cycle of FIG. 2.

FIG. 3A presents another exemplary embodiment of this invention in which the thermal switching apparatus portion utilizes flexible metallic flaps 88 and 90, e.g., of gold leaf, which are either attracted or repelled by electrodes 84 and 86 respectively at the capacitor in accordance with the requirements of the thermodynamic cycle of FIG. 2.

The structural details of the embodiment 60 shown in FIG. 3A are comparable in several respects to aspects of the embodiment 10 of FIG. 1A. Thus, liquid He load 62 is comparable to load 18; Stirling engine 64 is comparable to thermal reservoir 16; crystals 66 and 68 are comparable to crystals 26 and 28 respectively; electrodes 70, 72 and 74 are comparable to electrode 32, 30 and 34 respectively; variable high voltage source 78 is comparable to voltage source 36. Housing 80 and chamber 82 therein are comparable to housing 42 and chamber 40 respectively of FIG. 1A.

Structural details for embodiment 60 of FIG. 3A which are different than are present for embodiment 10 of FIG. 1 include insulating layers 84 and 86 on crystals 66 and 68 respectively. Mechanical flaps 88 and 90 of heat conductive material are mounted on support bases 92 and 94 respectively which are connected through housing 80 to liquid He load 62 and to Stirling engine 64 respectively. Electrodes 70 and 74 are connected to low voltage alternating signal source 96 and flaps 88 and 90 are connected to high voltage variable source 98 and 100 respectively.

For the operation of the embodiment 60 of FIG. 3A, flexible heat exchanger flaps 88 and 90 are charged so as to be attracted to or repelled from electrodes 70 and 74 alternately as appropriate to make or break thermal contact to load 62 and to reservoir 64 respectively. Heat is transferred both by contact to the electrically insulating films 84 and 86 and by conduction through He across small gaps left between a flap and the respective electrode. The He is maintained in chamber 82 via pipe 80 from a source not shown, and is maintained by a plug 81-1. If an initial vacuum is desired, it is obtained via pipe 80-2 by a vacuum source not shown and is maintained by plug 80-2.

FIG. 3B illustrates another embodiment 110 of this invention which is similar in many respects to the embodiment shown in FIG. 3A and is so numbered. A single crystal 112 is present in embodiment 110 and the electrodes 70 and 74 are operated from a high voltage variable source 114.

Figure 4:
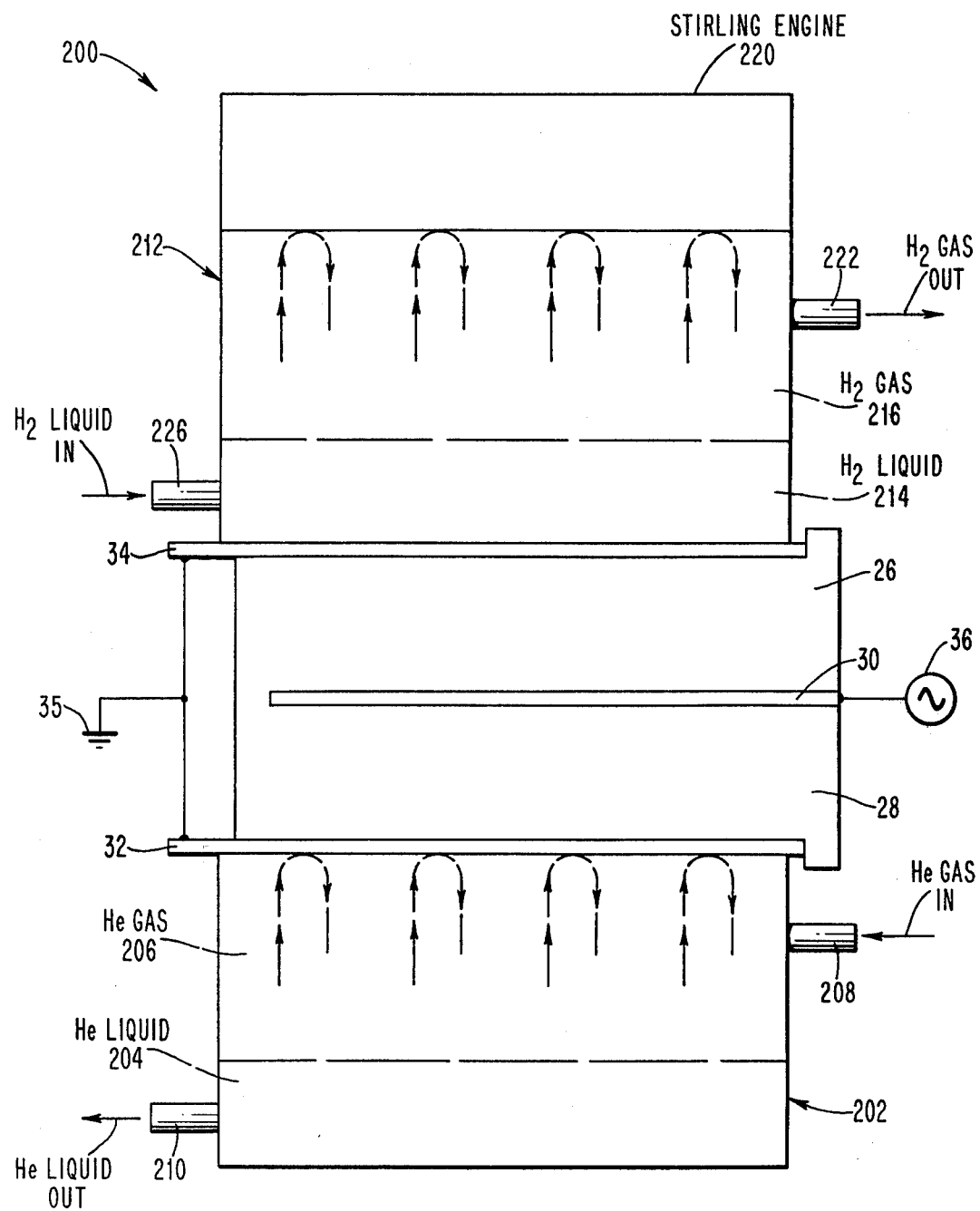
FIG. 4 presents still another exemplary embodiment of this invention wherein thermal rectifier devices are utilized to transfer thermal energy per the requirements of the thermodynamic cycle of FIG. 2.

FIG. 4 presents still another exemplary embodiment of this invention wherein thermal rectifier devices rather than thermal switching apparatus are used to transfer thermal energy to an from the dielectric material per the requirements of the thermodynamic cycle of FIG. 2. An examplary thermal rectifier device use gases $^3$He, $^4$He, $H_2$, HD, $D_2$ or Ne per the requirements of the literature article by R. L. Garwin et al presented by International Institute of Refrigeration, Commission 1, Delft 1958, Annexe 1958-1; Supplement au Bulletin de l'Institut International du Froid — Extrait, pages 83–89. The terminology and technology as disclosed by said reference being incorporated herein by reference for the purpose of the practice of the present invention.

The capacitor and electrical apparatus of the embodiment 200 shown in FIG. 4 is identical to that illustrated in FIG. 1 and aspects thereof are identically numbered.

The thermal rectifier technology for utilizing the refrigerator capability of the embodiment of FIG. 4 will now be described. Container 202 is in contact with electrode 32 and holds both He liquid 204 and He gas 206. He gas is introduced into container 202 via pipe 208 and liquid He is removed therefrom via pipe 210 so that the liquified He may be used to cool the load.

Container 212 is in contact with electrode 34 and holds both $h_2$ liquid 214 and $H_2$ gas 216 which is in contact with Stirling refrigerator engine 220, which is used to dissipate the heat transferred to it from the load by means of the dielectric refrigerator according to this invention.

In order to maintain the gas pressure within container 212 constant and to improve thermal contact with the Stirling engine, $H_2$ gas is removed from container 212 through pipe 222 to the interior of the Stirling engine where it is again liquified and returned through pipe 226.

The operation of the embodiment 200 of FIG. 4 will now be described. Under a given starting condition, there is a given amount of He per se in container 202 and a given amount of $H_2$ per se in container 212. The He gas 206 is in thermal quasi-equilibrium with the He liquid 204; and the $H_2$ gas 216 is in thermal quasi-equilibrium with $H_2$ liquid 214. The thermodynamic cycle of FIG. 2 is followed. The orientable defect dipoles are aligned adiabatically during the A to B phase of the cycle. Then, during the B to C phase the $H_2$ liquid boils isothermally to remove the heat generated in the crystals 26 and 28. Then the orientable defect dipoles adiabatically randomize their orientation during the C to D phase. Then, the He gas condenses on the electrode 34 loses energy and enters the liquid state during the D to A phase. Because of the different boiling points for $H_2$ and He at convenient operating pressure, thermal rectification may be continued on a steady state basis.

FIG. 5 shows schematically the alignment and randomization of the defect dipoles with the applied electric field through the course of the thermodynamic cycle of FIG. 2. Although the variation of the field is shown as saw-tooth, it need only be monatonically increasing A to B to C and decreasing C to D to A, e.g., it may be sinusoidal for convenience of practice of the invention. The stages of the cycle are labeled as in FIG. 2.

Practice of this invention has been exemplified herein through description of embodiments wherein the thermal reservoir was stated to be a Stirling engine. Illustrative literature references for the Stirling thermodynamic cycle are: book entitled "Heat-Power Engineering" (Part I) by W. N. Barnard et al, Third Edition 1926, pages 166–168, John Wiley and Sons, Inc.; and book entitled "Expansion Machines for Low Temperature Processes", by S. C. Collins, pages 13–17, Oxford University Press, 1958. The terminology and technology as disclosed by these references are incorporated by reference for the purpose of the practice of the present invention.

In the embodiments of this invention presented hereinbefore, the electrodes for establishing the electric field in dielectric material for polarization of the defect dipoles therein were in the thermal paths between the dielectric material and the thermal load and thermal reservoir. It is recognized for the practice of this invention that means for establishing the electric field may be completely distinct from the thermal paths to load and reservoir. For example, the capacitor 20 with associated electrodes in FIG. 1A can be turned 90 circular degrees so that blades 12 and 14 communicate thermally with the longitudinal surfaces shown as perpendicular to the blades provided only that electrical isolation of the electrodes is maintained. This may be accomplished by use of electrically insulating blades.

The electrical waveforms of the applied voltages for establishing electric fields for polarizing the defect dipoles in the dielectric material of a dielectric refrigerator per the principles of the invention may have various temporal and spatial characteristics. Illustratively, ramp voltages from conventional sources are suitable for the thermodynamic cycle illustrated in FIG. 2. Further, alternating voltages both sinusoidal and non-sinusoidal are readily coordinated for all electrical requirements of the practice of this invention.

In the description of the embodiments hereof presented hereinbefore, the shape of the dielectric material has been shown as rectangular. It is recognized that a capacitor for a dielectric refrigerator of this invention may have many distinctive shapes and forms. Illustratively, a spherical dielectric material with a spherical central electrode and a circumferential spherical electrode therefor can achieve the required polarization of defect dipoles therein.

It has been noted hereinbefore that many as-grown materials have clustering of defect dipoles therein. Generally, conventional technology is available to produce the requisite host materials with appropriate defect dipole distributions. An exemplary annealing and quenching technology for distributing defect dipoles of OH in LiF will now be described. The crystal is wrapped in platinum foil, placed in a vacuum furnace and heated to 800° C. at which temperature it is held for five hours. Then the furnace is turned off and cooled to room temperature. The crystal cools in the vacuum to room temperature in approximately five minutes.

What is claimed is:

1. A refrigerator operable electrocalorically by orientable defect dipoles in a dielectric material subjected to a variable electric field which comprises:
    an electrically insulating solid dielectric material having orientable dipole defects dispersed therein;
    electrode means for applying a variable electric field in said material; and
    thermal energy transport means for exchanging thermal energy between said dielectric material and relatively low and high temperature regions comprising thermal load and thermal reservoir respectively;
    said thermal energy transport means includes thermally conductive mechanical means for intermittently and sequentially communicating thermal energy from said load to said material and from said material to said reservoir, and
    said thermally conductive mechanical means includes first and second mechanical devices for intermittently and sequentially communicating thermal energy from said load to said material and from said material to said reservoir.

2. A refrigerator as set forth in claim 1 in which said material comprises LiF and said dipole defects are selected from the group consisting of OH and $NH_2$.

3. A refrigerator as set forth in claim 1 wherein said material is selected from the group consisting of MgO and BeO and said dipole defects are selected from the group consisting of HF, HCl, HBr, HI and NH.

4. A refrigerator as set forth in claim 1 wherein said material has Debye temperature greater than approximately 500° Kelvin.

5. A refrigerator as set forth in claim 1 wherein one said mechanical device comprises a first blade means mobile with respect to said dielectric material and said thermal reservoir and said other mechanical device comprises a second blade means mobile with respect to said dielectric material and said thermal load.

6. A refrigerator as set forth in claim 1 wherein said mechanical devices comprise first and second flexible flaps controllable electrically for establishing sequentially thermal conduction paths with said dielectric material.

7. A refrigerator operable electrocalorically by orientable defect dipoles in a dielectric material subjected to a variable electric field which comprises:
    an electrically insulating solid dielectric material having orientable dipole defects dispersed therein;
    electrode means for applying a variable electric field in said material; and
    thermal energy transport means for exchanging thermal energy between said dielectric material and relatively low and high temperature regions comprising thermal load and thermal reservoir respectively,
    said thermal energy transport means includes thermally conductive mechanical means for intermittently and sequentially communicating thermal energy from said load to said material and from said material to said reservoir.

* * * * *